(12) United States Patent
Wang

(10) Patent No.: US 7,775,711 B2
(45) Date of Patent: Aug. 17, 2010

(54) TEMPERATURE MEASUREMENT DEVICE AND MEASUREMENT METHOD

(75) Inventor: Changlin Wang, Shanghai (CN)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/333,635

(22) Filed: Dec. 12, 2008

(65) Prior Publication Data

US 2009/0122834 A1    May 14, 2009

Related U.S. Application Data

(63) Continuation of application No. PCT/EP2007/057368, filed on Jul. 17, 2007.

(30) Foreign Application Priority Data

Jul. 17, 2006    (CN) .................. 2006 1 0028999

(51) Int. Cl.
*G01K 7/00*    (2006.01)
(52) U.S. Cl. .................. 374/183; 374/170; 374/173; 327/513; 327/512
(58) Field of Classification Search .................. 374/163, 374/173, 170; 327/512, 513
See application file for complete search history.

(56) References Cited

U.S. PATENT DOCUMENTS

| | | | |
|---|---|---|---|
| 3,754,442 A * | 8/1973 | Arnett | 374/173 |
| 3,783,692 A | 1/1974 | Hansen | |
| 4,546,320 A * | 10/1985 | Ott | 307/651 |
| 4,854,723 A * | 8/1989 | Her | 374/179 |
| 5,796,291 A * | 8/1998 | Mattes et al. | 327/513 |
| 2007/0183478 A1 * | 8/2007 | Becker et al. | 374/183 |

FOREIGN PATENT DOCUMENTS

| | | |
|---|---|---|
| CN | 2692646 Y | 4/2005 |
| JP | 56074628 A * | 6/1981 |
| JP | 58178234 A * | 10/1983 |
| JP | 63-229338 A | 9/1988 |

OTHER PUBLICATIONS

International Search Report (PCT/ISA/210).

* cited by examiner

*Primary Examiner*—Gail Verbitsky
*Assistant Examiner*—Mirellys Jagan
(74) *Attorney, Agent, or Firm*—Buchanan Ingersoll & Rooney PC

(57) ABSTRACT

An exemplary temperature measurement device includes a reference voltage source, a three-wire thermal resistor, a voltage drop amplifier, an operational amplifier and compensation resistors. By using connecting wires with resistance values of the compensation resistors, a relation between an output signal and a resistance of the thermal resistor gives rise to a monotonous function, which is independent of the resistances of the connecting wires. After A/D conversation of an output signal, the resistance of the thermal resistor and a temperature can be calculated based on known functions. Therefore, within an entire measurement range and any length of cable, an influence of the wire resistances can be compensated without switches or jumpers.

35 Claims, 3 Drawing Sheets

TEMPERATURE MEASUREMENT DEVICE AND MEASUREMENT METHOD

RELATED APPLICATIONS

This application claims priority under 35 U.S.C. §119 to Chinese Application 200610028999.6 filed in China on Jul. 17, 2006, and as a continuation application under 35 U.S.C. §120 to PCT/EP2007/057368 filed as an International Application on Jul. 17, 2007 designating the U.S., the entire contents of which are hereby incorporated by reference in their entireties.

TECHNICAL FIELD

A device and a measurement method are disclosed for measuring temperatures with a thermal resistor based on a principle for compensating the connecting wire resistances.

BACKGROUND INFORMATION

Temperatures are often measured with electrical temperature sensors. In particular, thermal resistors, known as RTD (Resistance Temperature Detector), such as PT10, PT100, PT1000, NTC30, NTC22, are used. They are based on the principle that a current flowing through the thermal resistor causes a voltage difference over the RTD, which is related to the temperature of the RTD in a monotonous way.

For measuring a temperature with an RTD, the RTD is exposed to the site which temperature is of interest at least until the RTD reaches thermal equilibrium. Afterwards a known current is conducted through the RTD. This current can be relatively small in order to minimize measurement errors arising from an ohmic heating of the material of the RTD. This is followed by measuring the voltage across the RTD. The resistance can be calculated from the known current and the measured voltage, which value is related to the temperature at the site of interest.

In practice, the RTD is often physically inaccessible. For example, the RTD might be placed deep in a caustic chemical bath arranged remotely from the measurement instrumentation. As a result, wire leads can be used to connect the RTD to a voltage measurement circuit. In such cases, the determined resistance is the sum of the RTD resistance and the wire resistance associated with the extended wire leads. The wire resistance might introduce measurement errors, especially for PT10, PT100 and PT1000.

One approach for eliminating the adverse effect of the connecting wire resistance is to apply a so-called four-wire connection. One pair of wires is used for voltage measurements only, whereas the other pair of wires conducts the measurement current. However, this solution can generate significant additional costs for the wiring.

Another approach for eliminating the adverse effect of the connecting wire resistance is to apply a so-called three-wire connection. According to this implementation, the thermal resistor is connected to the voltage measurement circuit by three connecting wires. The third wire helps to compensate the impact of the wire resistance. However, this three-wire connection involves use of a proper voltage measurement circuit.

A common approach to build measurement devices suitable for conducting the three-wire method is to use a dual constant-current source. However, the accuracy of such a circuit relies heavily on the two current sources being identical. To avoid the difficulties associated with obtaining two identical current sources, methods with a single current source are generally used.

Different solutions have been proposed for suitable voltage measurement circuits with a single constant-current source.

For example CN2692646 describes a circuit with a single constant-current source and an operational amplifier which serves as a subtraction unit. However, such circuits can be complicated and the measurement range of the circuit is relatively narrow. Therefore, adjustments of the circuit and the constant-current source, like switching or jumpering, are used for changing to different temperature ranges or to different types of thermal resistors.

On the other hand, simple circuits can only compensate the effect of the connecting wire resistance for a limited number of points of the measurement range, rather than fully compensating any measurement point over the whole measurement range.

SUMMARY

A temperature measurement device is disclosed, comprising: a thermal resistor with a first terminal, which is connected via a first connecting wire to a first input of an operational amplifier, which is configured to deliver an output signal that corresponds to a measured temperature, and a second terminal, which is connected via a third connecting wire to a common potential, the second terminal also being connected via a second connecting wire to an input of a voltage drop amplifier, the voltage drop amplifier having an output connected via a first resistor to a second input of the operational amplifier, and wherein the first input and an output of the operational amplifier are connected to each other.

A method for temperature measurement with a device is disclosed having a thermal resistor with a first terminal connected via a first connecting wire to a first input of an operational amplifier, and a second terminal connected via a third connecting wire to a common potential, the second terminal also being connected via a second connecting wire and a voltage drop amplifier to a second input of the operational amplifier, the method comprising: transmitting a signal of the second terminal of the thermal resistor via the second connecting wire to the voltage drop amplifier that sends an amplified signal via a first resistor to the second input of the operational amplifier; feeding an output signal of the operational amplifier to the first input of the operational amplifier; and delivering from the operational amplifier the output signal that corresponds to a measured temperature.

BRIEF DESCRIPTION OF THE DRAWINGS

Features and advantages of the present disclosure will be described with reference to the accompanying drawings, wherein.

DETAILED DESCRIPTION

Figure 1:
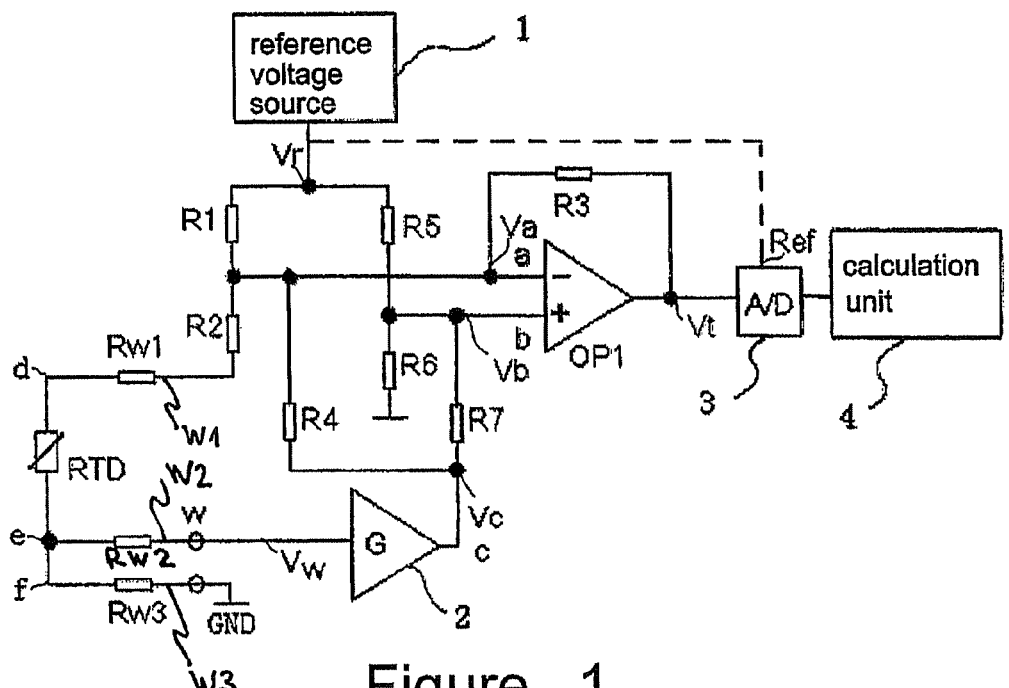
FIG. 1 shows an exemplary circuit diagram illustrating an electrical principle of a temperature measurement device according to a first embodiment of the present disclosure, with a voltage drop amplifier, and two resistors $R_1$ and $R_2$ serially connecting a voltage reference source to a first connecting wire.

A method for measuring temperatures is disclosed with thermal resistors and a temperature measurement device, which can have a simple structure, a large measurement range and which can compensate the effect of connecting wires substantially independent from the type of the thermal resistor and for any resistance value over an entire commonly used temperature measurement range.

An exemplary temperature measurement device according to the disclosure, which is based on a principle for compensating connecting wire resistances, comprises a thermal resistor with a first terminal, which is connected via a first connecting wire to a first input of an operational amplifier and a second terminal, which is connected via a third connecting wire to a common potential, in particular a ground potential, and the second terminal is also connected via a second wire to a second input of the operational amplifier, said operational amplifier has an output and delivers an output signal that is related to a measured temperature. The second wire is connecting the second terminal of the thermal resistor to an input of a voltage drop amplifier comprising an output, the output being connected via a first resistor to the second input of the operational amplifier. The first input and the output of the operational amplifier are connected to each other, if applicable via a second resistor. This arrangement allows controlling the voltage drop across the thermal resistor, so that it does not follow variations in the resistances of the connecting wires. Therefore, the electrical current flowing through the thermal resistor can be independent of the resistance of the connecting wires and therefore, the sensitivity of the operational amplifier OP1 will not vary with respect to the resistance of the thermal resistor when the resistances of the connecting wires vary.

An exemplary disclosed device is substantially a constant voltage exciting circuit opposed to a constant current exciting circuit. Therefore, it can advantageously have a simple structure, and a very large measurement range. In addition, the constant voltage exciting circuit can advantageously provide a high level of stability or alternatively a low level of drifting. The same circuit is capable of measuring different types of thermal resistors such as PT100, PT1000, and NTC30 without the need of any internal rearrangements such as switching of any connections or jumpering of any wires. This large range can be well beyond any of the commonly used single constant current approaches or double constant current approaches.

In a second exemplary embodiment of the disclosure, the voltage drop amplifier has a gain, which is greater than 2, in particular greater than 10. A gain greater than 2 can be used to achieve a desired compensation effect of the wire drop voltage over a large temperature measurement range.

In an exemplary embodiment of the disclosure, the output of the voltage drop amplifier is connected via a third resistor to the first input of the operational amplifier. This third resistor allows eliminating the influence of the resistance of the connecting wire on the output signal of the operational amplifier. The third resistor together with the first resistor can give rise to a defined monotonous function between the output signal and the resistance of the thermal resistor RTD, the output signal being independent of the resistances of the connecting wires. In order to fully compensate the influence of the resistances of the connecting wires on the output signal the third resistor $R_4$ can be substantially set according to the expression $$R_4 = \left(\frac{G}{2} - 1\right) R_3,$$

wherein G is the gain of the voltage drop amplifier and $R_3$ the second resistor.

The connection of the output of the voltage drop amplifier to the first input of the operational amplifier via the third resistor allows eliminating the offset influence, which is given by the connection via the first resistor. A suitable selection of the circuit parameters, in particular of the resistance of the first resistor and the resistance of the third resistor, leads to a defined monotonous relation between the output signal and the resistance of the thermal resistor, wherein the output signal is independent of the resistance of the connecting wires.

In a further embodiment of the disclosure, the second input of the operational amplifier is connected via a fourth resistor to a reference voltage source and via a fifth resistor to ground potential. This allows to define the excitation voltage of the thermal resistor and also to properly adjust to the measurement requirements. In order to achieve a full compensation of the influence of the resistances of the connecting wires, the resistance of the first resistor R7 can be substantially set according to the expression $$R_7 = \left(\frac{G}{2} - 1\right) \frac{1}{\frac{1}{R_5} + \frac{1}{R_6}},$$

with G being the gain of the voltage drop amplifier, $R_5$ being the fourth resistor and $R_6$ being the fifth resistor.

In an alternative embodiment of the disclosure, the second input of the operational amplifier is connected to an excitation voltage reference, which provides an excitation voltage and which comprises an internal resistance. The resistance of the first resistor can be substantially set according to the expression:

$$R_7 = \left(\frac{G}{2} - 1\right) R_{in}$$

with G being the gain of the voltage drop amplifier, $R_{in}$ being the internal resistance of the excitation voltage reference. The excitation voltage reference is a voltage source and works similar to the reference voltage source with an attached voltage divider.

In another embodiment of the disclosure, the first input of the operational amplifier is connected, in particular via a sixth resistor, to a reference voltage source. The connection to a voltage source allows adjusting the range of the output signal in accordance with the requirements of any further processing, for example with the input range of an analog-digital-converter. In this case, in order to fully compensate the influence of the resistances of the connecting wires the resistance of the third resistor $R_4$ is substantially set according to the expression $$R_4 = \left(\frac{G}{2} - 1\right) \frac{1}{\frac{1}{R_1} + \frac{1}{R_3}},$$

with G being the gain of the voltage drop amplifier, $R_1$ being the sixth resistor and $R_3$ being the second resistor.

In a further embodiment of the disclosure, the first connecting wire is connected via a seventh resistor to the first input of the operational amplifier. With this additional resistor the range of the output signal of the measurement device can be adjusted in accordance with the characteristics of any further processing steps such as an analog-digital-conversion.

In an exemplary embodiment of the disclosure, the first input of the operational amplifier is an inverting input and the second input of the operational amplifier is a non-inverting input. In this configuration, the operational amplifier is providing a controlled constant excitation voltage for the thermal resister RTD.

In an exemplary embodiment of the disclosure, the voltage drop amplifier is a further operational amplifier, of which the non-inverting input is connected to the second wire and of which the inverting input is connected via an eighth resistor to the output of the voltage drop amplifier and which further operational amplifier is also via a ninth resistor to ground potential. Therefore, the gain of the voltage drop amplifier can be adjusted easily by selecting suitable resistances for the eighth and ninth resistors.

Further, in an exemplary embodiment of the previous embodiment, the non-inverting input of the further operational amplifier can be connected via a tenth resistor to the second wire and via an eleventh resistor to ground potential. In the case this embodiment is used with only 2 connecting wires, this can advantageously eliminate the need of wiring bridges, which connect the input of the operational amplifier to the ground potential.

In an exemplary embodiment of the disclosure, the first conductive wire and the third conductive wire can comprise the same material and have approximately the same resistance.

According to an exemplary embodiment, the output signal of the operational amplifier is forwarded to a signal processing unit, such as an analog-digital-conversion unit, which provides a digital signal for a calculation unit and which is, if applicable, connected to a common reference voltage source. In this way the temperature calculation can be processed digitally. In particular, the temperature can be calculated using software comprising a known functional relation between the resistance of the thermal resistor and the temperature.

If the reference voltage of the analog-digital-converter is connected to the reference voltage or if both voltages are in a corresponding relation, the present device can be insensitive to variations of the reference voltage, which can thereby provide a high accuracy of the measuring results.

An exemplary temperature measurement method according to the disclosure can be based on a principle for compensating connecting wire resistances, and comprise a thermal resistor with a first terminal that is connected via a first connecting wire to a first input of an operational amplifier and a second terminal, which is connected via a third connecting wire to a common potential, in particular a ground potential, and the second terminal is also connected via a second wire to a second input of the operational amplifier, which operational amplifier delivers an output signal that corresponds to the measured temperature. A signal of the second terminal of the thermal resistor can be transmitted via the second wire to a voltage drop amplifier that sends the amplified signal via a first resistor to the second input of the operational amplifier, and the output signal of the operational amplifier can be fed, where appropriate, via a second resistor, to the first input of the operational amplifier.

In an exemplary embodiment of the disclosure the signal of the second terminal of the thermal resistor is amplified by the voltage drop amplifier with a gain that is greater than 2, in particular greater than 10.

In a further exemplary embodiment, the voltage drop amplifier sends the amplified signal via a third resistor to the first input of the operational amplifier.

In a further embodiment, the operational amplifier is excited by an excitation voltage reference, which provides an excitation voltage and which comprises an internal resistance.

In another embodiment of the disclosure, the thermal resistor is driven by an excitation voltage, which is controlled by the operational amplifier. This enables to control and to maintain the sensitivity of the thermal resistor on a defined level over a wide measurement range.

In a further embodiment of the disclosure, intermediate values are calculated, for example, during an initial phase and/or a calibration phase, and stored for further calculations. This can avoid recalculations of essentially constant values. Furthermore, the resistance of the thermal resistor $R_T$ can be calculated with intermediate values A and B according to the expression:

$$R_T = \frac{B}{V_T - A},$$

or when the first connecting wire is connected via a seventh resistor $R_2$ to a first input of the operational amplifier, according to the formula $$R_T = \frac{B}{V_T - A} - R_2,$$

wherein $V_T$ is the output signal. In this way, the resistance values of the thermal resistor $R_T$ can be calculated fast and efficiently.

Referring to FIG. 1, an exemplary temperature measurement device for thermal resistors comprises a reference voltage source 1 for providing a reference voltage $V_r$, a thermal resistor RTD for measuring a temperature T, a voltage drop amplifier 2 having a gain of G, an operational amplifier OP1, a first resistor $R_7$, a second resistor $R_3$, a third resistor $R_4$, a forth resistor $R_5$, a fifth resistor $R_6$, a sixth resistor $R_1$ and a seventh resistor $R_2$. The output signal $S_T$, in particular $V_T$, of the operational amplifier OP1 is transmitted to the analog-digital-conversion unit 3 and further transmitted to the calculation unit 4 for calculating the temperature value T.

The thermal resistor RTD has a first terminal d connected to a first connecting wire W1 and a second terminal e which is connected to a second connecting wire W2 and a third connecting wire W3.

$R_{w1}$, $R_{w2}$ and $R_{w3}$ represent the resistances of the first, second and third conductive wires W1, W2 and W3, which connect the thermal resistor RTD to the processing parts of the measurement device. The wires W1, W2, W3 can comprise the same material and/or are identical in length, leading to practically identical wire resistances $R_{w1}=R_{w2}=R_{w3}$ for all three wires. However, in an exemplary embodiment, the only requirement is that $R_{w1}$ is substantially equal to $R_{w3}$.

The operational amplifier OP1 has an inverting input a, a non-inverting input b and an output providing the output voltage $V_T$, which corresponds to the output signal $S_T$. The input bias current of the operational amplifier OP1 can be extremely small and can in general be neglected.

The voltage drop amplifier 2 has an input w and an output c, the gain being G. G can be, for example, larger than 2 (e.g., larger than 10). The input bias current in this case can again be extremely small and can in general be neglected.

Figure 2:
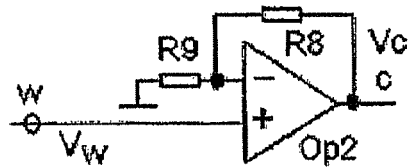
FIG. 2 shows an exemplary circuit diagram illustrating an alternative embodiment for the voltage drop amplifier of FIG. 1 by implementation of an operational amplifier.

FIG. 2 shows an alternative embodiment of the disclosure, wherein the voltage drop amplifier 2 comprises a second operational amplifier OP2, a eighth resistor $R_8$ and a ninth resistor $R_9$. The non-inverting input of the second operational amplifier OP2 serves as the input w for the signal of the second wire W2, which is connected to the second terminal e of the thermal resistor RTD. The eighth resistor $R_8$ is connected to the output and the inverting input of the second operational amplifier OP2, and the ninth resistor $R_9$ is on one end connected to the inverting input of the second operational amplifier OP2 and on the other end grounded. Therefore the gain G can be expressed as $$G = \left(\frac{R_8}{R_9} + 1\right).$$

Referring again to FIG. 1, the thermal resistor RTD has a resistance $R_T$, which has a known monotonous functional relation to the temperature T to be measured. The thermal resistor RTD comprises a first terminal d and a second terminal e, wherein the first terminal d is connected to the inverting input a of the operational amplifier OP1 via a first conductive wire W1 and the seventh resistor $R_2$, and wherein the second terminal e is connected to the input w of the voltage drop amplifier 2 via a second conductive wire W2 and is grounded via a third conductive wire W3. Alternatively, the third conductive wire W3 can be connected to the second terminal e via a common terminal f.

The sixth resistor $R_1$ and the seventh resistor $R_2$ can be used to set the measurement range of the measurement device. The resistor $R_1$ can be selected in such a way that when resistance value $R_T$ of the thermal resistor RTD is maximal, the output voltage $V_T$ of the measurement device still remains within the range of the input voltage of the analog-digital-converter 3. With an adequate maximum of the resistance $R_T$, the circuit can be realized without the sixth resistor $R_1$.

The seventh resistor $R_2$ can be selected in such a way that when the resistance value $R_T$ of thermal resistor RTD is minimal, the output voltage $V_T$ still remains within the range of the input voltage of the analog-digital-converter 3. With an adequate minimum of the resistance $R_T$, the circuit can be realized even with resistor $R_2$ short circuited.

From now on it is assumed that the resistor $R_1$, more precisely its resistance, is infinite or that the resistance of $R_2$ and the inverse resistance of $R_1$ are both zero, $R_1^{-1}=0$ and $R_2=0$.

The fourth resistor $R_5$ and the fifth resistor $R_6$ can be used to set the exciting voltage of the thermal resistor RTD. The fourth resistor $R_5$ is connected to the reference voltage source 1 and is also connected to the non-inverting input b of the operational amplifier OP1. One end of the resistor $R_6$ is connected to the non-inverting input b of the operational amplifier OP1 and the other end is grounded.

The second resistor $R_3$ is connected across the output and inverting input of the operational amplifier OP1.

The third resistor $R_4$ and the first resistor $R_7$ compensate the circuit, so that a defined monotonous functional relation between the output voltage $V_T$ and the corresponding output signal $S_T$ and the resistance value $R_T$ of the thermal resistor RTD exists. The third resistor $R_4$ is connected to the inverting input of the operational amplifier OP1 and is also connected to the output c of the voltage drop amplifier 2. The first resistor $R_7$ is connected to the non-inverting input b of the operational amplifier OP1 and is also connected to the output c of the voltage drop amplifier 2.

The third resistor $R_4$ and the first resistor $R_7$ can be selected in order to provide a full compensation of voltage drop across the connecting wires. For all values of the resistance $R_T$ of the thermal resistor RTD over its entire range, as well as for any lengths of the first, second and third conductive wires W1, W2, W3, if Rw1=Rw3, then the expression for full compensation, under the assumption that $R_{W1}=R_{W3}$, can be:

$$R_4 = \left(\frac{G}{2} - 1\right)R_{13} \text{ and } R_7 = \left(\frac{G}{2} - 1\right)R_{56},$$

$$\text{with } R_{13} = \left(\frac{1}{R_1} + \frac{1}{R_3}\right)^{-1} \text{ and } R_{56} = \left(\frac{1}{R_5} + \frac{1}{R_6}\right)^{-1},$$

wherein G is the gain of the voltage drop amplifier 2.

In comparison to a constant current exciting circuit, exemplary embodiments of the present circuit can have a much simpler structure and consequently an output signal having a nonlinear relation to the resistance of the temperature resistor can easily be corrected through the processing or displaying steps, which are explained in more detail below.

In selecting the first and third resistors $R_7$ and $R_4$ for any resistance $R_T$ within the measurement range, it is assumed that the voltage drop $V_w$ across the conductive wires W1 and W3 are always equal, when the currents flowing through the conductive wires W1 and W3, $R_{w1}$ and $R_{w3}$ are assumed to be equal. The current flowing through the conductive wire $R_{w2}$ can be neglected. This is due to the fact that when the material or length of the connection cable varies, the individual wires W1 and W3 and their resistances $R_{w1}$ and $R_{w3}$ change simultaneously.

The selection of the gain G of the voltage drop amplifier and the resistance of the first resistor $R_7$ can have the result that the voltage $V_b$ at point b is by twice the voltage $V_w$ higher than $V_{b0}$ at point b with $R_{W1}=R_{W3}=0$. An exemplary feature of the operational amplifier OP1 is that $V_a$ of the inverting input is equal to $V_b$ of the non-inverting input. Therefore, the voltage drop across the thermal resistor RTD will remain unchanged and the electrical current flowing through the thermal resistor RTD will not vary when $R_{W1}$ and $R_{W3}$ vary. Therefore, the sensitivity of the operational amplifier OP1 will not vary with respect to the resistance $R_T$ of the thermal resistor RTD when the resistances $R_{W1}$ and $R_{W3}$ vary.

However, as the voltage $V_b$ and the voltage $V_a$ vary, the output of the operational amplifier OP1 is still subjected to a variation in the absence of other measures. The third resistor $R_4$ is selected in order to, for example, completely eliminate such influence. An adequate selection of the third and first resistor $R_4$, $R_7$ in the present circuit will have a defined monotonous functional relation between the output signal $S_T$ and the resistance $R_T$ of the thermal resistor RTD as a result and, further, the output signal $S_T$ is independent of $R_{W1}$, $R_{w2}$ and $R_{W3}$.

The voltage $V_c$ at the output c of the voltage drop amplifier is $V_c = G*V_w$, as can be shown by circuit analysis.

First $R_{567}$ is expressed as $$R_{567} = \left(\frac{1}{R_5} + \frac{1}{R_6} + \frac{1}{R_7}\right)^{-1}$$

and the current balance at point b is expressed as $$\frac{V_r - V_b}{R_5} = \frac{V_b}{R_6} + \frac{V_b - V_c}{R_7}, \text{ leading to } V_b = \left(\frac{V_r}{R_5} + \frac{V_c}{R_7}\right)$$

$$R_{567} = \frac{R_{567}}{R_5}V_r + \left(\frac{R_{567}}{R_7}G\right)*V_w.$$

Further, with $R_{W1} = R_{W3} = 0$ the voltage $V_{b0}$ at point b can be expressed as $$V_{b0} = \frac{R_{567}}{R_5}V_r.$$

In order to obtain
$V_b = V_{b0} + 2V_w$, it follows, that $$\left(\frac{R_{567}}{R_7}G\right) = 2 \text{ and}$$

$$\frac{G}{2} = \frac{R_7}{R_{567}} = R_7\left(\frac{1}{R_5} + \frac{1}{R_6} + \frac{1}{R_7}\right) = R_7\left(\frac{1}{R_5} + \frac{1}{R_6}\right) + 1$$

$$R_7 = \left(\frac{G}{2} - 1\right)\left(\frac{1}{R_5} + \frac{1}{R_6}\right)^{-1} = \left(\frac{G}{2} - 1\right)R_{56}$$

Where the first resistor $R_7$ is larger than zero, it can be deduced that $G > 2$.

Therefore, $V_b = V_{b0} + 2V_w$, because $V_a = V_b$ is a feature of the operational amplifier. The sum of the voltage drops across the seventh resistor $R_2$ and RTD will remain unchanged and the current flowing through $R_T$ and $R_2$ will not vary when $R_{W1}$ and $R_{W3}$ vary.

Further, the current balance at point a will be considered:

$$\frac{V_T - V_b}{R_3} = \frac{V_b - V_r}{R_1} + \frac{V_b - V_c}{R_4} + \frac{V_b - 2V_w}{R_T + R_2},$$

-continued $$\frac{V_T}{R_3} = \left(\frac{\frac{V_{b0} - V_r}{R_1} +}{\frac{V_{b0}}{R_3} + \frac{V_{b0}}{R_4}}\right) + \left(\frac{\frac{2V_w}{R_1} + \frac{2V_w}{R_3} +}{\frac{2V_w - GV_w}{R_4}}\right) + \frac{V_{b0}}{R_T + R_2}.$$

Let $\frac{2}{R_1} + \frac{2}{R_3} + \frac{2 - G}{R_4} = 0$, that is, $R_4 = \left(\frac{G}{2} - 1\right)\left(\frac{1}{R_1} + \frac{1}{R_3}\right)^{-1} = \left(\frac{G}{2} - 1\right)R_{13}$ leading to $V_T$ being independent of $V_w$.

With $$R_{134} = \left(\frac{1}{R_1} + \frac{1}{R_3} + \frac{1}{R_4}\right)^{-1}, R_{567} = \left(\frac{1}{R_5} + \frac{1}{R_6} + \frac{1}{R_7}\right)^{-1}$$

and also with $$A = \left(-\frac{R_3}{R_1} + \frac{R_{567}}{R_5}\frac{R_3}{R_{134}}\right)V_r, \text{ and } B = \left(\frac{R_{567}}{R_5}R_3\right)V_r,$$

it can be deduced, that $$V_T = A + \frac{B}{R_T + R_2}$$

It has been shown, that $A$, $B$, $R_2$, and $V_T$ are all independent of $R_{w1}$, $R_{w2}$ and $R_{w3}$. During the measurement, the digital representation of $S_T$ is obtained by an A/D conversion of $V_T$. The software comprised in calculation unit 4 can calculate the resistance $R_T$ of the thermal resistor RTD from the expression $$R_T = \frac{B}{V_T - A} - R_2.$$

Afterwards, the temperature T can be calculated according to the known function relation between $R_T$ and temperature T.

If the reference voltage Ref of the analog-digital-converter 3 is equal to the reference voltage $V_r$, or if they are in certain proportion to the same source, exemplary embodiments of the present circuit can be insensitive to a variation of the reference voltage $V_r$ and therefore, provide a high accuracy of the measurement results.

The function of the sixth and seventh resistor $R_1$ and $R_2$ can be deduced from the expression for calculating $V_T$. When the resistance $R_T$ of the thermal resistor RTD is relatively large, a larger value of $R_1$ can be selected, so that $V_T$ will not be too small and will still remain within the range of the input voltage of the analog-digital-converter 3. When the resistance $R_T$ of the thermal resistor RTD is relatively small, a larger value of $R_2$ can be selected, so that $V_T$ will not be too large and will still remain within the range of the input voltage of the analog-digital-converter 3.

As described previously, the resistor $R_2$ can be short circuited, if the resistance $R_T$ of the thermal resistor has a suitable minimum. Likewise, the resistor $R_1$ can also generally be omitted, if the resistance $R_T$ of the thermal resistor RTD has a suitable maximum.

Figure 3:
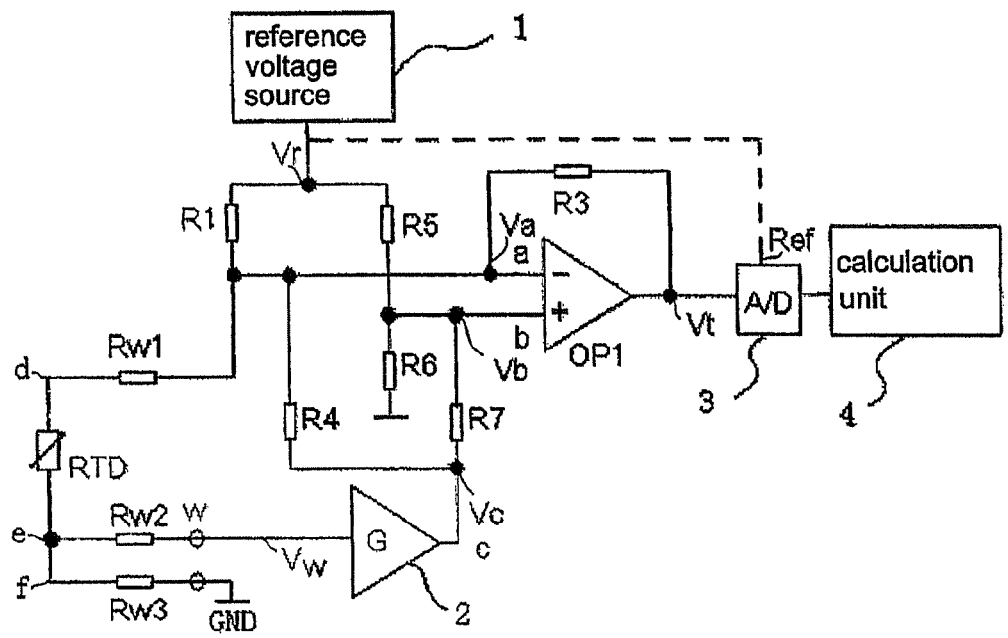
FIG. 3 shows an exemplary circuit diagram of a further embodiment according to FIG. 1, but with resistor $R_2$ set to zero.

A second embodiment of the measurement device shown in FIG. 3 differs from the first embodiment shown in FIG. 1 in that the range setting resistor $R_2$ is short circuited ($R_2$=0) without changing the selection of the third and first compensation resistors R4 and R7 mentioned above.

Figure 4:
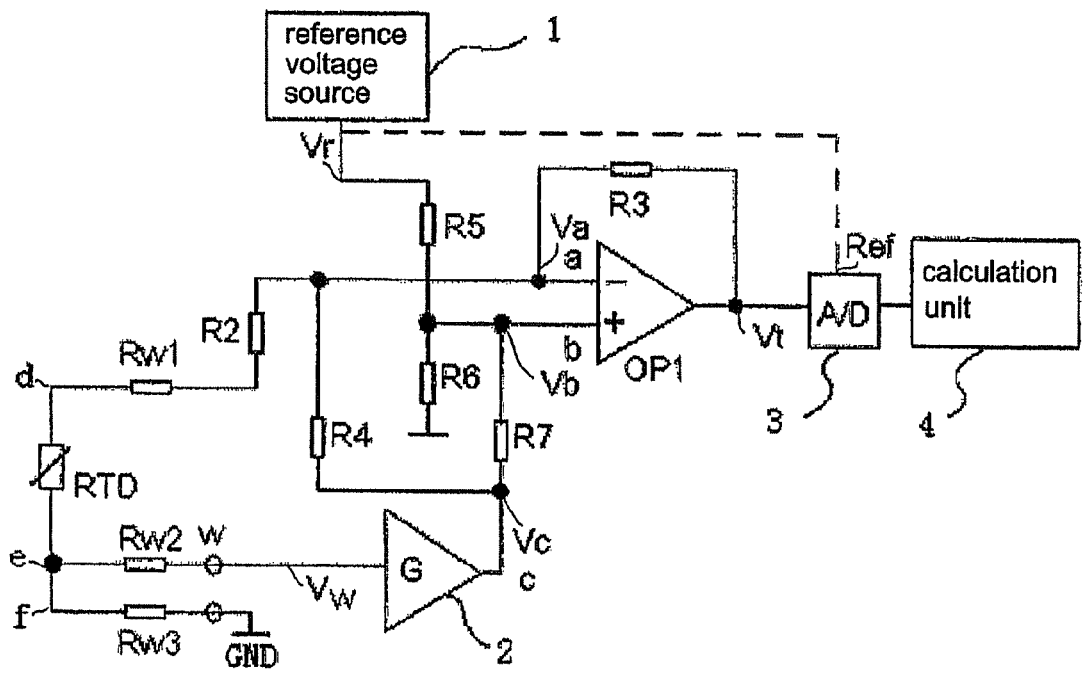
FIG. 4 shows an exemplary circuit diagram of a further embodiment according to FIG. 1, but without resistor $R_1$.

A third embodiment of the measurement device shown in FIG. 4 differs from the first embodiment shown in FIG. 1 in that the range setting resistor $R_1$ is omitted ($1/R_1$=0).

Figure 5:
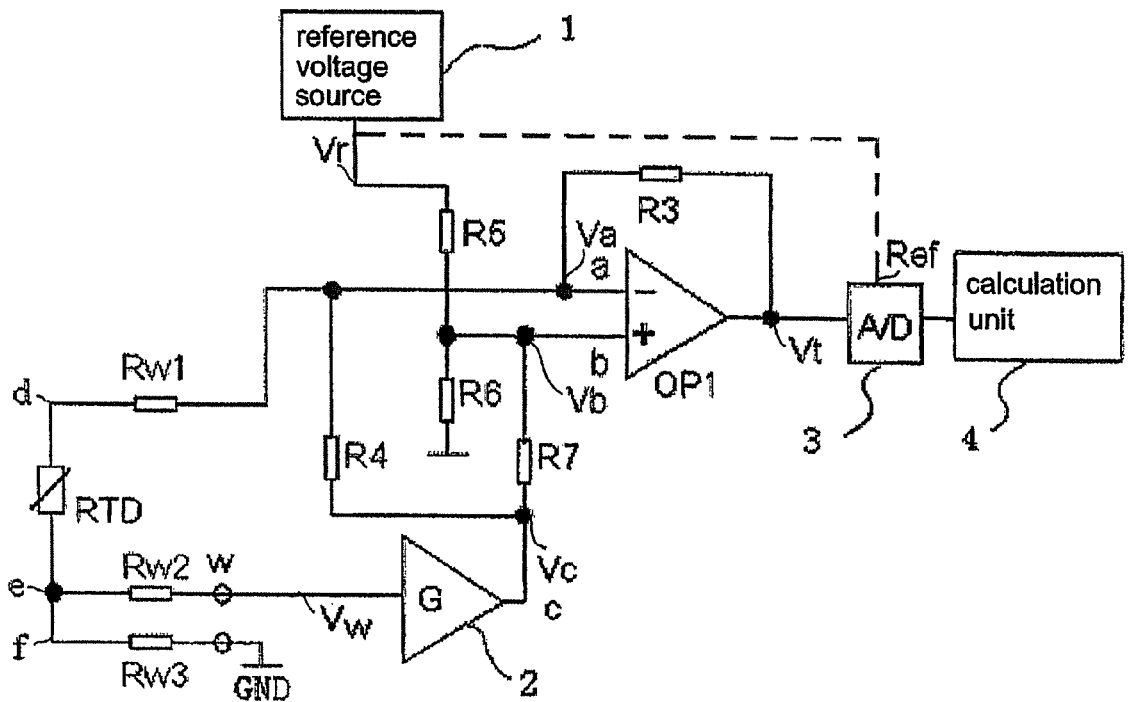
FIG. 5 shows an exemplary circuit diagram of a further embodiment according to FIG. 4, but with resistor $R_2$ set to zero.

A fourth embodiment of the measurement device shown in FIG. 5 differs from the first embodiment shown in FIG. 1 in that the resistor $R_1$ is omitted and $R_2$ is short circuited ($1/R_1$=0, $R_2$=0).

For the embodiments shown in FIGS. 4 and 5 the selection of the third resistor $R_4$ and the first resistor $R_7$ can be expressed as follows:

$$R_4 = \left(\frac{G}{2}-1\right)R_3 \text{ and } R_7 = \left(\frac{G}{2}-1\right)\left(\frac{1}{R_5}+\frac{1}{R_6}\right)^{-1} = \left(\frac{G}{2}-1\right)R_{56}$$

with $V_T = A + \dfrac{B}{R_T}$ leading to $$R_T = \frac{B}{V_T - A},$$

from said expression the resistance $R_T$ and the temperature T can be calculated using the software.

In the first and third embodiments of the present disclosure, the exciting voltage can be constant under the condition that the seventh resistor $R_2$ is present and $R_2$ is considered to be a part of the thermal resistor RTD:

$$V_{2T} = V_a - 2V_w = V_b - 2V_w = V_{b0} = \frac{R_{567}}{R_5}V_r,$$

wherein $V_{2T}$ is the sum of the voltage drops across the resistors $R_2$ and $R_T$.

In the second and fourth embodiments of the present disclosure, $V_{2T}$ will be the voltage drop across $R_T$ under the condition that the resistor $R_2$ is short circuited.

Figure 6:
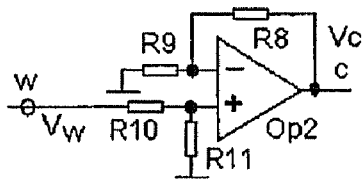
FIG. 6 shows an exemplary circuit diagram of an alternative embodiment for the voltage drop amplifier of FIG. 2 with two additional resistors.

FIG. 6 shows an alternative embodiment of the voltage drop amplifier 2 with tenth resistor $R_{10}$ and eleventh resistor $R_{11}$, where $R_{11}$ is much larger than $R_{10}$ and $R_{w2}$ of the second connecting wire W2, and input resistance of the non-inverting input of the operating amplifier OP2 is much larger than $R_{11}$. The gain G of the voltage drop amplifier 2 becomes $$G = \left(\frac{R_8}{R_9}+1\right)*\left(\frac{R_{11}}{R_{11}+R_{10}+R_{w2}}\right),$$

which under the above preconditions can be approximated by:

$$G = \left(\frac{R_8}{R_9}+1\right)*\left(\frac{R_{11}}{R_{11}+R_{10}}\right) \text{ while } \frac{R_{11}}{R_{11}+R_{10}}$$

equals almost 1.

With this embodiment, there is no need to manually connect the input connection terminal w of the voltage drop amplifier 2 to ground (GND), if the sensor is connected by only two wires because the eleventh resistor $R_{11}$ serves as a connection. An exemplary requirement that $R_{11}$ should be much larger than $R_{w2}$ can be met. Therefore in reality, the resistance $R_{w2}$ will have almost no influence to the gain G of the voltage drop amplifier 2 so that the method according to this embodiment is still accurate.

Figure 7:
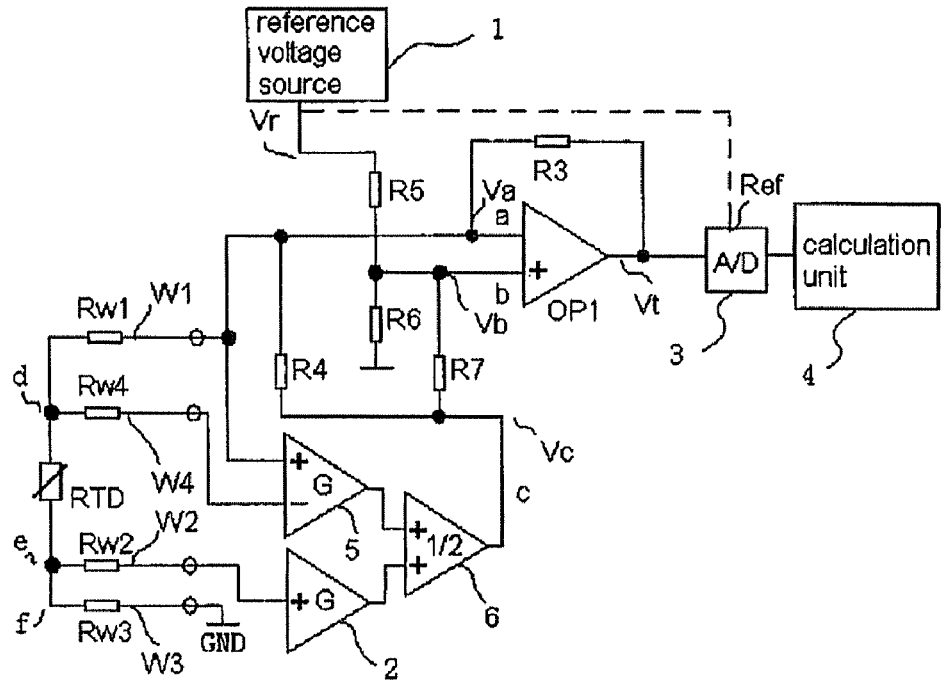
FIG. 7 shows an exemplary circuit diagram of a further embodiment according to FIG. 1, but with a four wire connection of the thermal resistor, a differential amplifier and an averaging amplifier.

In a further embodiment as shown in FIG. 7, the circuit is used for temperature resistors with a 4-wire configuration. In this case the wire compensation works similar to a 3-wire configuration, but with an exemplary advantage, that equal wire resistances, like $R_{W1}$ being substantially equal to $R_{W3}$, is not required. For this implementation requires additional devices like a differential amplifier 5 with gain G and an averaging amplifier 6. The differential amplifier 5 senses the voltage drop on the connecting wire W1 and the voltage drop amplifier 2 senses the voltage drop on connecting wire W3. The output of the averaging amplifier 6 is equal to a voltage sum multiplied by the factor G/2, whereby the sum is the voltage drop of the first connecting wire W1 and the second connecting wire W3. Further, the gain of the voltage drop amplifier 2 and the gain of the differential amplifier 5 and their input polarization can be different, like G1 and G2, if the multiplying factor is adjusted to the average of the gain factors G1 and G2. The previous formulas can remain unchanged and the accuracy of the result is the same as for the three wire configuration.

Figure 8:
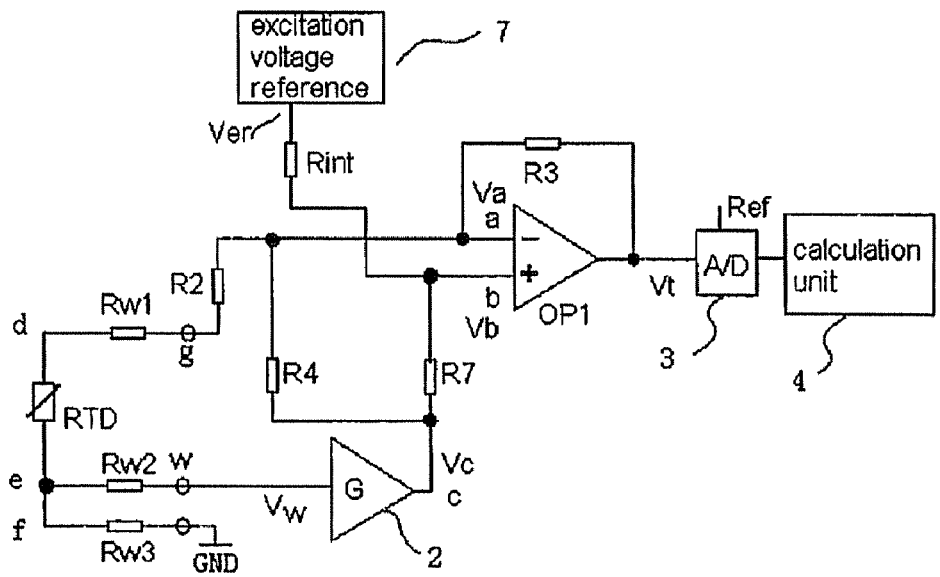
FIG. 8 shows an exemplary circuit diagram illustrating an electrical principle of a temperature measurement device according to a further embodiment of the present disclosure with an excitation voltage source.

FIG. 8 shows a further embodiment of the present disclosure, with an excitation voltage reference 7, which is equivalent to the reference voltage source 1, combined with the fourth resistor $R_5$ and fifth resistor $R_6$ of FIG. 1. The excitation voltage reference 7 provides an excitation voltage $V_{er}$, which equals to $V_r*R_6/(R_6+R_5)$ and internal resistance $R_{int}$ equals to $1/(1/R_5+1/R_6)$. Accordingly, the values $R_{56}$ and $R_{567}$ in the previous calculations are obtained by: $R_{56}=R_{int}$ and $R_{567}=1/(1/R_{int}+1/R_7)$.

In any case, an exemplary embodiment of the present circuit is substantially a constant voltage exciting circuit. As it is not a constant current exciting circuit, although the output signal $S_T$, which corresponds to the output voltage $V_T$, is not linearly proportional to $R_T$, but once $V_T$ is A/D converted, it is very easy to obtain the accurate resistance $R_T$, and therefore, the accurate temperature T by using the software. A comparison with the constant current exciting circuit shows, that an exemplary circuit can have an advantageously simple structure and a very large measurement range. The circuit can be capable of measuring different types of thermal resistors, such as for example PT100, PT1000, and NTC30, when provided with a highly precise A/D in combination with the regulation capability of the resistors $R_1$ and $R_2$. The same circuit can be used to measure different types of thermal resistors like PT100, PT1000, and NTC30, even when it does not comprise any internal rearrangements. The large measurement range can be well beyond any of the commonly used single constant current or double constant current approaches. The software comprised in the calculation unit 4 can automatically recognize the type of the thermal resistors and the temperature can be measured accurately, as long as the thermal resistance values of the thermal resistors are not overlapped within the measurement range. Generally, NTC22 will not be used simultaneously with NTC30, because their thermal resistance values are often overlapping.

For some RTD temperature sensors, such as NTC30, the resistance $R_T$ is very large, and further, for some temperature sensors PT1000, the connecting conductive wires are quite short, or when the measurement accuracy requirement is not very high, the resistances of the wires can be regarded as small with respect to the resistance $R_T$. In that case, the sensor and the connecting wire are connected as a 2-wire configuration instead of the three-wire configuration, that is, the wire represented by $R_{w2}$ does not exist. Here the input connection terminal w of the voltage drop amplifier is simply connected to ground (GND) or connected by $R_{11}$. The circuit still works well even though the wire resistances $R_{w1}$, $R_{w3}$ cannot be compensated by the circuit, however this is of no importance for this setup.

Therefore, the present circuit is especially suitable for thermal resistor (RTD) sensors, however, at the same time, it is also capable to work with other types of sensors connected by 2, 3 and 4 connecting wires.

An exemplary set of workable resistance values are given as follows: resistor $R_1$ is omitted, resistor $R_2$: 511Ω, resistor $R_3$: 1.87 kΩ, resistor $R_4$: 60.4 kΩ, resistor $R_5$: 100 kΩ, resistor $R_6$: 33.2 kΩ, resistor $R_7$: 806 kΩ, resistor $R_8$: 100 kΩ, resistor $R_9$: 1.5 kΩ, resistor $R_{10}$: 2.7 kΩ and resistor $R_{11}$: 180 kΩ. With these resistance values, the measurement device works well for thermal resistors RTD for the most common temperature measurement applications. In particular, thermal resistors RTD of the type PT100 and PT1000 within the temperature range between 0° C. and 200° C. and for the type NTC30 between 0° C. and 100° C. Thereby the connecting wires can be as long as 100 meters and still being fully compensated.

The description of the above embodiments are only the explanations for the exemplary embodiments of the invention, other equivalent substitutions and modifications can be made by those skilled in the art based on the description of the above embodiments of the invention. However, the equivalent substitutions and modifications made based on the embodiments of the invention belong to the inventive spirit of the invention and fall within the patent scope defined by the claims.

In the claims, identifiers such as "first", "second", "third" and so forth are considered arbitrary. For example, the reference to a "third" element in the absence of a "second" element does not imply, nor does it exclude, the existence of the "second" element in the claim.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES 1 reference voltage source
2 voltage drop amplifier
3 analog-digital-conversion unit
4 calculation unit
5 differential amplifier
6 averaging amplifier
7 excitation voltage reference
OP1, OP2 operational amplifier
RTD thermal resistor
W1, W2, W3, W4 connecting wire
$R_1$ sixth resistor
$R_2$ seventh resistor
$R_3$ second resistor
$R_4$ third resistor
$R_5$ fourth resistor
$R_6$ fifth resistor
$R_7$ first resistor
$R_8$ eighth resistor
$R_9$ ninth resistor
$R_{10}$ tenth resistor
$R_{11}$ eleventh resistor
$R_T$ resistance of the thermal resistor
$R_{w1}, R_{w2}, R_{w3}, R_{w4}$ resistance of the connecting wire
$R_{int}$ internal resistance of excitation voltage reference
RTD thermal resistor
w input of the voltage drop amplifier
a, b input of the operational amplifier
c output of the voltage drop amplifier
d, e, f terminal of the thermal resistor
$V_a$, $V_b$ voltage at the input of the operational amplifier
$V_c$ voltage at the output of the voltage drop amplifier
$V_w$ voltage drop across wire
$V_T$ output voltage
$S_T$ output signal
T temperature
$V_r$ reference voltage
$V_{er}$ excitation voltage

What is claimed is:

1. A temperature measurement device, comprising:
a first connecting wire;
a second connecting wire;
a third connecting wire;
a first resistor;
a third resistor;
an operational amplifier with a first input, a second input, and an output, the output being configured to deliver an output signal that corresponds to a measured temperature;
a voltage drop amplifier with an input and an output; and
a thermal resistor with a first terminal, which is connected via the first connecting wire to the first input of the operational amplifier, and a second terminal, which is connected via the third connecting wire to a common potential, the second terminal also being connected via the second connecting wire to the input of the voltage drop amplifier, the output of the voltage drop amplifier being connected via the first resistor to the second input of the operational amplifier,
wherein the first input and the output of the operational amplifier are connected to each other, and
wherein the output of the voltage drop amplifier is connected via the third resistor to the first input of the operational amplifier.

2. The temperature measurement device according to claim 1, wherein the voltage drop amplifier has a gain, which is greater than 10.

3. The temperature measurement device according to claim 1, comprising a second resistor, wherein the voltage drop amplifier has a gain G greater than 2,
wherein the first input and the output of the operational amplifier are connected to each other via the second resistor, and wherein the resistance $R_4$ of the third resistor is substantially set according to the expression:

$$R_4 = \left(\frac{G}{2} - 1\right)R_3,$$

with $R_3$ being the resistance of the second resistor.

4. The temperature measurement device according to claim 1, comprising a seventh resistor, wherein the first connecting wire is connected via the seventh resistor to the first input of the operational amplifier.

5. The temperature measurement device according to claim 1, comprising:
   an eighth resistor; and
   a ninth resistor, wherein the voltage drop amplifier is a further operational amplifier, the voltage drop amplifier having a non-inverting input connected to the second connecting wire and an inverting input connected via the eighth resistor to the output of the voltage drop amplifier and via the ninth resistor to ground potential.

6. The temperature measurement device according to claim 1, wherein the first connecting wire and the third connecting wire have approximately a same resistance.

7. The temperature measurement device according to claim 1, comprising:
   a signal processing unit configured to receive the output signal of the operational amplifier, the signal processing unit comprising an analog-digital-conversion unit that provides a digital signal for a calculation unit and that is connected to a common reference voltage source.

8. The temperature measurement device according to claim 1, being configured to compensate connecting resistances and comprising a second resistor, wherein the voltage drop amplifier has a gain greater than 10, and the first input and the output of the operational amplifier are connected via the second resistor.

9. The temperature measurement device according to claim 1, comprising:
   a signal processing unit for receiving the output signal of the operational amplifier.

10. The temperature measurement device according to claim 1, comprising a second resistor, wherein the first input and the output of the operational amplifier are connected to each other via the second resistor.

11. The temperature measurement device according to claim 1, comprising:
    a fourth resistor; and
    a fifth resistor, wherein the second input of the operational amplifier is connected via the fourth resistor to a reference voltage source, and via the fifth resistor to ground potential.

12. The temperature measurement device according to claim 11, wherein the voltage drop amplifier has a gain G greater than 2,
    wherein a resistance $R_7$ of the first resistor is substantially set according to the expression:

$$R_7 = \left(\frac{G}{2} - 1\right)\left(\frac{1}{R_5} + \frac{1}{R_6}\right)^{-1},$$

with $R_5$ being the resistance of the fourth resistor and $R_6$ being the resistance of the fifth resistor.

13. The temperature measurement device according to claim 1, wherein the second input of the operational amplifier is connected to an excitation voltage reference, which provides an excitation voltage and which comprises an internal resistance.

14. The temperature measurement device according to claim 13, wherein the voltage drop amplifier has a gain G greater than 2, and
    wherein the resistance $R_7$ of the first resistor is substantially set according to the expression:

$$R_7 = \left(\frac{G}{2} - 1\right)R_{in},$$

with $R_{in}$ being the internal resistance.

15. The temperature measurement device according to claim 1, comprising a sixth resistor, wherein the first input of the operational amplifier is connected via the sixth resistor to a reference voltage source.

16. The temperature measurement device according to claim 15, comprising a second resistor, wherein the voltage drop amplifier has a gain G greater than 2,
    wherein the first input and the output of the operational amplifier are connected to each other via the second resistor, and
    wherein the resistance $R_4$ of the third resistor is substantially set according to the expression:

$$R_4 = \left(\frac{G}{2} - 1\right)\left(\frac{1}{R_1} + \frac{1}{R_3}\right)^{-1},$$

with $R_1$ being the resistance of the sixth resistor and $R_3$ being the resistance of the second resistor.

17. The temperature measurement device according to claim 1, wherein the first input of the operational amplifier is an inverting input, and
    wherein the second input of the operational amplifier is a non-inverting input.

18. The temperature measurement device according to claim 17, comprising:
    an eighth resistor; and
    a ninth resistor, wherein the voltage drop amplifier is a further operational amplifier, of which a non-inverting input is connected to the second connecting wire, and of which an inverting input is connected via the eighth resistor to the output of the voltage drop amplifier and via the ninth resistor to ground potential.

19. The temperature measurement device according to claim 1, comprising:
    a tenth resistor; and
    an eleventh resistor, wherein the voltage drop amplifier is a further operational amplifier, the non-inverting input of the said further operational amplifier being connected via the tenth resistor to the second connecting wire and via the eleventh resistor to ground potential.

20. The temperature measurement device according to claim 19, wherein the first connecting wire and the third connecting wire have approximately a same resistance.

21. The temperature measurement device according to claim 1, comprising a second resistor, wherein the voltage drop amplifier has a gain G greater than 2, with the first input and the output of the operational amplifier are connected to each other via the second resistor, the output of the voltage drop amplifier are connected via the second resistor to the first input of the operational amplifier, and the resistance $R_4$ of the third resistor is substantially set according to the expression:

$$R_4 = \left(\frac{G}{2} - 1\right)R_3,$$

with $R_3$ being the resistance of the second resistor.

22. The temperature measurement device according to claim 21, comprising:
a fourth resistor; and
a fifth resistor, wherein the second input of the operational amplifier is connected via the fourth resistor to a reference voltage source, and via the fifth resistor to ground potential.

23. The temperature measurement device according to claim 21, wherein the second input of the operational amplifier is connected to an excitation voltage reference, which provides an excitation voltage and which comprises an internal resistance.

24. A method for temperature measurement with a device having a thermal resistor with a first terminal and a second terminal, the first terminal being connected via a first connecting wire to a first input of an operational amplifier, the second terminal being connected via a third connecting wire to a common potential, the second terminal also being connected via a second connecting wire and a voltage drop amplifier to a second input of the operational amplifier, the method comprising:
transmitting a signal of the second terminal of the thermal resistor via the second connecting wire to the voltage drop amplifier that sends an amplified signal via a first resistor to the second input of the operational amplifier;
feeding an output signal of the operational amplifier to the first input of the operational amplifier; and
delivering from the operational amplifier the output signal that corresponds to a measured temperature, wherein the voltage drop amplifier sends the amplified signal via a third resistor to the first input of the operational amplifier.

25. The method according to claim 24, wherein the second input of the operational amplifier is excited by an excitation voltage reference, which provides an excitation voltage and which comprises an internal resistance.

26. The method according claim 24, wherein a resistance $R_T$ of the thermal resistor is calculated with intermediate values according to the expression:

$$R_T = \frac{B}{V_T - A},$$

with A and B being the intermediate values and $V_T$ being an output voltage,
or in case that the first connecting wire is connected via a seventh resistor to the first input of the operational amplifier, according to the expression:

$$R_T = \frac{B}{V_T - A} - R_2,$$

with $R_2$ being the resistance of said seventh resistor.

27. The method according to claim 23, wherein the first input and the output of the operational amplifier are connected to each other via a second resistor.

28. The method according to claim 24, wherein the thermal resistor is driven by an excitation voltage, which is controlled by the operational amplifier.

29. The method according claim 28, comprising:
calculating intermediate values during an initial phase and/or a calibration phase; and
storing the intermediate values for further calculations.

30. The method according claim 24, comprising:
calculating intermediate values during an initial phase and/or a calibration phase; and
storing the intermediate values for further calculations.

31. The method according claim 30, wherein a resistance of the thermal resistor $R_t$ is calculated with intermediate values according to the expression:

$$R_T = \frac{B}{V_T - A},$$

with A and B being the intermediate values and $V_T$ being an output voltage,
or in case that the first connecting wire is connected via a seventh resistor to the first input of the operational amplifier, according to the expression:

$$R_T = \frac{B}{V_T - A} - R_2,$$

with $R_2$ being the resistance of said seventh resistor.

32. The method according to claim 24, comprising:
amplifying the signal of the second terminal of the thermal resistor by the voltage drop amplifier with a gain that is greater than 2.

33. The method according to claim 32, wherein the voltage drop amplifier has a gain greater than 10, the output signal of the operational amplifier being connected via a second resistor to the first input of the operational amplifier, and
wherein current flowing in the thermal resistor is substantially independent of variations of resistances of the first, second, and third connecting wires.

34. The method according to claim 33, wherein the second input of the operational amplifier is excited by an excitation voltage reference, which provides an excitation voltage and which comprises an internal resistance.

35. The method according to claim 34, wherein the thermal resistor is driven by the excitation voltage, which is controlled by the operational amplifier.

* * * * *